US008659801B2

(12) United States Patent
Nakamura

(10) Patent No.: US 8,659,801 B2
(45) Date of Patent: Feb. 25, 2014

(54) IMAGE FORMING APPARATUS AND IMAGE FORMING METHOD DETERMINING CORRECT PIXEL VALUE OF TARGET PIXEL SUBJECT TO INTERPOLATION

(75) Inventor: Satoshi Nakamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 112 days.

(21) Appl. No.: 13/215,420

(22) Filed: Aug. 23, 2011

(65) Prior Publication Data
US 2012/0057209 A1 Mar. 8, 2012

(30) Foreign Application Priority Data

Sep. 8, 2010 (JP) ................................. 2010-200697

(51) Int. Cl.
*H04N 1/40* (2006.01)

(52) U.S. Cl.
USPC ......... 358/461; 358/3.13; 358/3.24; 358/474; 358/3.26; 358/463; 358/296; 358/3.07; 382/298; 382/299; 382/300; 382/199; 382/264; 382/144; 382/167; 382/195; 382/176; 382/154; 348/453; 348/333.12

(58) Field of Classification Search
USPC ..................... 347/254, 131; 348/453, 333.12; 382/298, 299, 300, 199, 264, 144, 167, 382/195, 261, 147, 154, 181, 312, 176, 382/269; 358/3.13, 3.24, 474, 1.7, 3.26, 358/3.27, 2.1, 1.4, 1.9, 1.2, 463, 296, 3.07, 358/531
See application file for complete search history.

(56) References Cited

U.S. PATENT DOCUMENTS

| 5,440,407 | A | * | 8/1995 | Overton ........................ 358/447 |
| 5,872,636 | A | * | 2/1999 | Kohtani et al. .............. 358/3.07 |
| 6,028,971 | A | * | 2/2000 | Inuiya et al. .................. 382/312 |
| 6,980,254 | B1 | * | 12/2005 | Nishihashi et al. ........... 348/452 |
| 2007/0188613 | A1 | * | 8/2007 | Nobori et al. .............. 348/207.1 |
| 2008/0002239 | A1 | * | 1/2008 | Toma et al. .................... 358/474 |
| 2010/0060949 | A1 | | 3/2010 | Kurigata |

FOREIGN PATENT DOCUMENTS

| EP | 1 365 571 A1 | 11/2003 |
| EP | 2 242 019 A1 | 10/2010 |
| JP | 2001-86333 A | 3/2001 |
| JP | 4199784 B2 | 10/2008 |
| JP | 4330164-82 | 6/2009 |

OTHER PUBLICATIONS

Nakagawa, Image Interpolation Device, Jun. 7, 2007, JP 2007142667 A.*
Cedric Mane et al., "Image Renaissance Using Discrete Optimization," The 18th International Conference on Pattern Recognition (ICPR'06), vol. 3, Jan. 1, 2006, pp. 631-634.

* cited by examiner

*Primary Examiner* — Benny Q Tieu
*Assistant Examiner* — Martin Mushambo
(74) *Attorney, Agent, or Firm* — Dickstein Shapiro LLP

(57) ABSTRACT

An image forming apparatus includes an image interpolation unit to compute a correct pixel value of a target pixel subject to interpolation of a halftone image. The image interpolation unit includes a base pattern setting unit to set a base pattern including the target pixel, a reference pattern setting unit to set reference pattern in a region peripheral to the target pixel, an analogous pattern acquisition unit to acquire at least one analogous pattern analogous to the base pattern from the reference pattern, a high-resolution pattern creating unit to create a high-resolution pattern having a predetermined resolution or higher by synthesizing the acquired analogous pattern, a pixel value estimating unit to compute an estimated pixel value of the target pixel based on the created high-resolution pattern, and a pixel value determination unit to determine the correct pixel value of the target pixel based on the computed estimated pixel value.

19 Claims, 11 Drawing Sheets

IMAGE FORMING APPARATUS AND IMAGE FORMING METHOD DETERMINING CORRECT PIXEL VALUE OF TARGET PIXEL SUBJECT TO INTERPOLATION

BACKGROUND OF THE INVENTION

1. Field of the Invention

The disclosures herein relate to an image forming apparatus and a method for forming an image.

2. Description of the Related Art

In a typical image forming apparatus, images are optically read via an image reader such as a scanner; however, when the images are being read, some of the image signals may be lost or some of the image signals read by the image reader may exhibit inaccurate values due to defects in an image sensor that reads image signals or due to presence of contaminated marks in an optical path such as contaminated marks on a contact glass. Further, since the image reader is composed of plural tiny contact image sensors, the image reader may fail to acquire image signals in gaps between the contact image sensors. Accordingly, the image read by the image reader in such conditions may be degraded due to lack of pixel values or presence of inaccurate pixels.

In order to overcome such image degradation, there are ordinary interpolation methods known to the art, one example of which includes estimating accurate pixel values corresponding to those of missing pixels or of inaccurate pixels by polynomial interpolation or pattern matching utilizing pixels peripheral to the missing or inaccurate pixels, and replacing the inaccurate pixel values derived from lack of pixels or presence of inaccurate pixels with the estimated pixel values.

With such an ordinary interpolation method, pixel values to be interpolated may be accurately estimated in an image having gradually changed pixel values; however, the accuracy of the estimated pixel values may be significantly degraded in an image having drastically changed pixel values. An example of the former (image with gradually changed pixel values) may be a photograph. In the image having gradually changed pixel values, since a sampling cycle for sampling an image is sufficiently shorter than a fluctuating cycle of the image pattern, pixel values to be interpolated may be accurately estimated by general polynomial interpolation. An example of the latter (image with drastically changed pixel values) may be a halftone image. In the image having drastically changed pixel values, resolution of the image needs to be sufficiently high comparative to lines per inch of the halftone image. If the resolution of the image is not sufficiently high, the sampling cycle may not be sufficiently short relative to the fluctuation cycle of the image pattern, and the original image pattern may not be reproduced by the general polynomial interpolation technique as a result. For example, if the image reader composed of contact image sensors fails to read a row of pixels due to gaps between the contact image sensors while reading the halftone image, and pixels corresponding to the missing row of pixels are interpolated by utilizing the ordinary interpolation, interpolation errors may periodically occur. The interpolation errors may result in pin stripes in the pixel interpolated image and hence, the pixel interpolated image may be significantly degraded. If pixels corresponding to the missing row of pixels are interpolated by utilizing the pattern matching, an appropriate analogous pattern may not be found near the pixels subject to interpolation due to a relationship between the resolution of the image and the lines per inch or a screen angle. If the search range (area) of the analogous pattern is increased, the pixel interpolation may be easily affected by changes in contents-dependent colors or luminance of the image.

In the ordinary interpolation method, there may not be a sufficient number of pixels utilized for interpolating the changed pixel values. Even if the pattern has a short cycle but the pattern is sampled by a sufficient sampling frequency, the original pattern may be accurately reproduced. Therefore, in order to estimate the pixel values of interpolating pixels (i.e., pixels utilized for interpolation) with high accuracy, it may be necessary to increase resolution of the pattern including the interpolating pixels.

Japanese Patent Publication No. 4330164 (hereinafter referred to as "Patent Document 1") discloses an interpolation technology.

However, in the interpolation technology disclosed in Patent Document 1, since the resolution of the analogous pattern utilized for the interpolation is the same as the resolution of the image, the pattern utilized for the interpolation may need to be highly analogous to the pattern including a pixel subject to interpolation in order to carry out accurate interpolation.

Meanwhile, in carrying out the interpolation on the halftone image utilizing the pattern matching, although dots of the halftone region have the same intensity, the dots of the halftone region may form different shapes according to positions of the image. This inconsistent shape may result from inconsistent sampling positions while sampling pixels of the image due to the resolution of the image failing to match an integral multiple of the lines per inch of the halftone dots. That is, even if the analogous pattern is searched for near the pixel subject to interpolation of a general halftone image, the analogous pattern having sufficiently matched pixels may not necessarily be found. The halftone dots form a two-dimensional pattern that has periodicity in a horizontal direction and a vertical direction. Accordingly, an optimal pattern for interpolation may not be found from the analogous patterns unless the pattern has phases matched with those of the pattern including the pixel subject to interpolation in both directions. If such a pattern is searched for in a wider range (area), the analogous pattern having the high matching level with that including the pixel subject to interpolation may be found. However, the more distance there is from the pixel subject to interpolation, the more likely the pattern may be affected by the content-dependent color or luminance. Consequently, the matching level may be degraded on the contrary.

SUMMARY OF THE INVENTION

It is a general object of at least one embodiment of the present invention to provide an image forming apparatus and an image forming method capable of conducting pixel interpolation with high accuracy for interpolating a pixel of a halftone image that substantially eliminates one or more problems caused by the limitations and disadvantages of the related art.

In one embodiment, there is provided an image forming apparatus including an image interpolation unit configured to compute a correct pixel value of a target pixel subject to interpolation of a halftone image. The image interpolation unit includes a base pattern setting unit configured to set a base pattern including the target pixel subject to interpolation; a reference pattern setting unit configured to set at least one reference pattern in a region peripheral to the target pixel subject to interpolation, the reference pattern having a size equal to or larger than a size of the base pattern; an analogous pattern acquisition unit configured to acquire at least one analogous pattern analogous to the base pattern from the reference pattern; a high-resolution pattern creating unit configured to create a high-resolution pattern having a predetermined resolution or higher by synthesizing the acquired one or more analogous patterns; a pixel value estimating unit configured to compute an estimated pixel value of the target pixel subject to interpolation based on the created high-resolution pattern; and a pixel value determination unit configured to determine the correct pixel value of the target pixel subject to interpolation based on the computed estimated pixel value of the target pixel subject to interpolation.

In another embodiment, there is provided a method for computing a correct pixel value of a target pixel subject to interpolation of a halftone image. The method includes setting a base pattern including the target pixel subject to interpolation; setting at least one reference pattern in a region peripheral to the target pixel subject to interpolation, the reference pattern having a size equal to or larger than a size of the base pattern; acquiring at least one analogous pattern analogous to the base pattern from the reference pattern; creating a high-resolution pattern having a predetermined resolution or higher by synthesizing the acquired one or more analogous patterns; computing an estimated pixel value of the target pixel subject to interpolation based on the created high-resolution pattern; and determining the correct pixel value of the target pixel subject to interpolation based on the computed estimated pixel value of the target pixel subject to interpolation.

BRIEF DESCRIPTION OF THE DRAWINGS

Other objects and further features of embodiments will be apparent from the following detailed description when read in conjunction with the accompanying drawings, in which.

DESCRIPTION OF THE PREFERRED EMBODIMENTS

In the following, preferred embodiments of the present invention are described with reference to the accompanying drawings. The embodiments generally include the following characteristics in view of pixel interpolation of a halftone image. That is, the embodiments generally are characterized by acquiring analogous patterns analogous to a source pattern including an inferior pixel subject to interpolation from a periphery of the inferior pixel subject to interpolation, creating a high resolution pattern by synthesizing the acquired analogous patterns, and estimating a pixel value of the pixel subject to interpolation. Accordingly, the pixel value of the pixel subject to interpolation may be estimated with higher accuracy by the image forming apparatus according to the embodiments than the ordinary image forming apparatuses.

Further, the embodiments are further characterized by estimating the pixel value of the pixel subject to interpolation for each of color components, and synthesizing the estimated pixel values for respective color components. Accordingly, even if the image is obtained by superimposing different color halftone images having different lines per inch and a screen angle, the pixel value of the pixel subject to interpolation may be estimated with high accuracy.

Next, features of the embodiments are described further in detail.

[First Embodiment]

Figure 1:
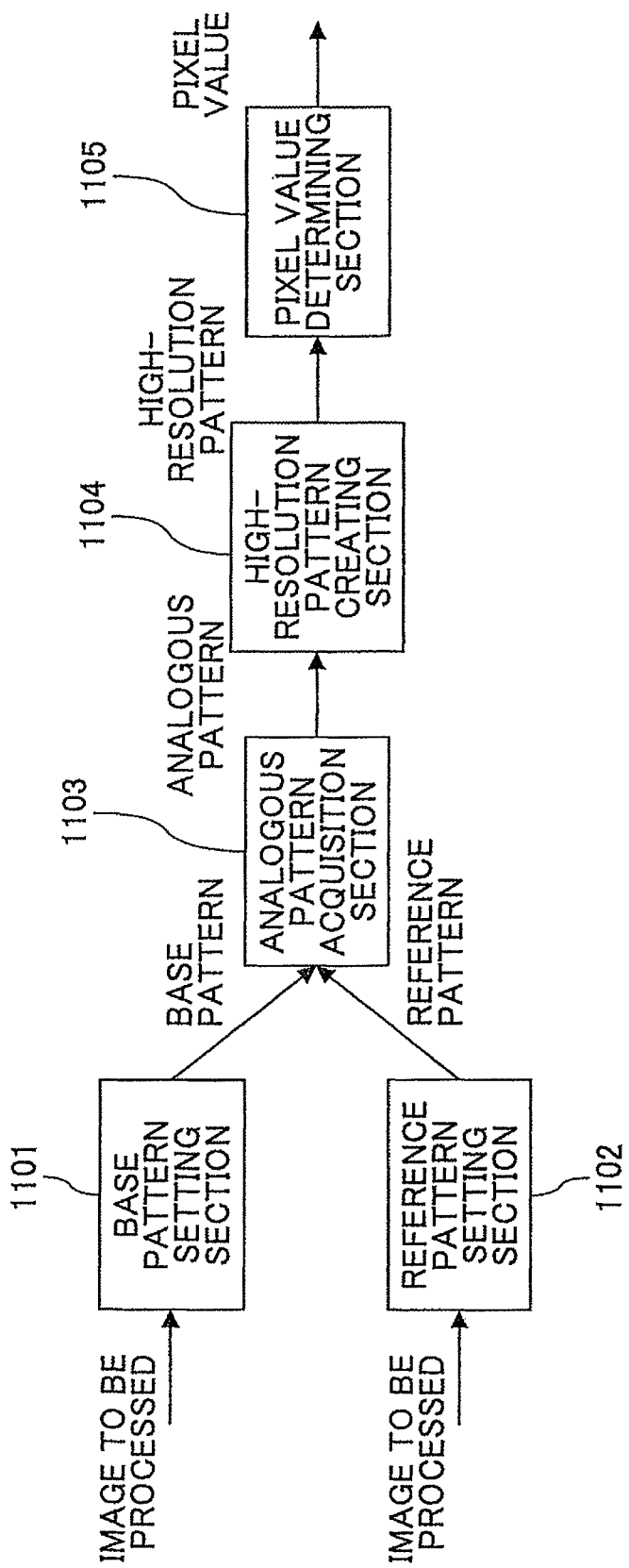
FIG. 1 is a functional block diagram illustrating functional components of an image interpolation device provided in an image forming apparatus according to a first embodiment.

FIG. 1 is a functional block diagram illustrating functional components of an image interpolation device provided in an image forming apparatus according to a first embodiment. The image interpolation device includes a base pattern setting section 1101 configured to set a base pattern of a predetermined size including a set target pixel subject to interpolation of an input image to be processed; a reference pattern setting section 1102 configured to set one or more reference patterns of the same size or a larger size in an area peripheral to the target pixel; an analogous pattern acquisition section 1103 configured to acquire one or more analogous patterns analogous to the base pattern from the reference patterns; a high-resolution pattern creating section 1104 configured to create a high resolution pattern having a predetermined value (resolution of ordinary image forming apparatus) or above by synthesizing the acquired analogous patterns; and a pixel value determining section 1105 configured to determine a pixel value of the target pixel based on the created high-resolution pattern.

Figure 2:
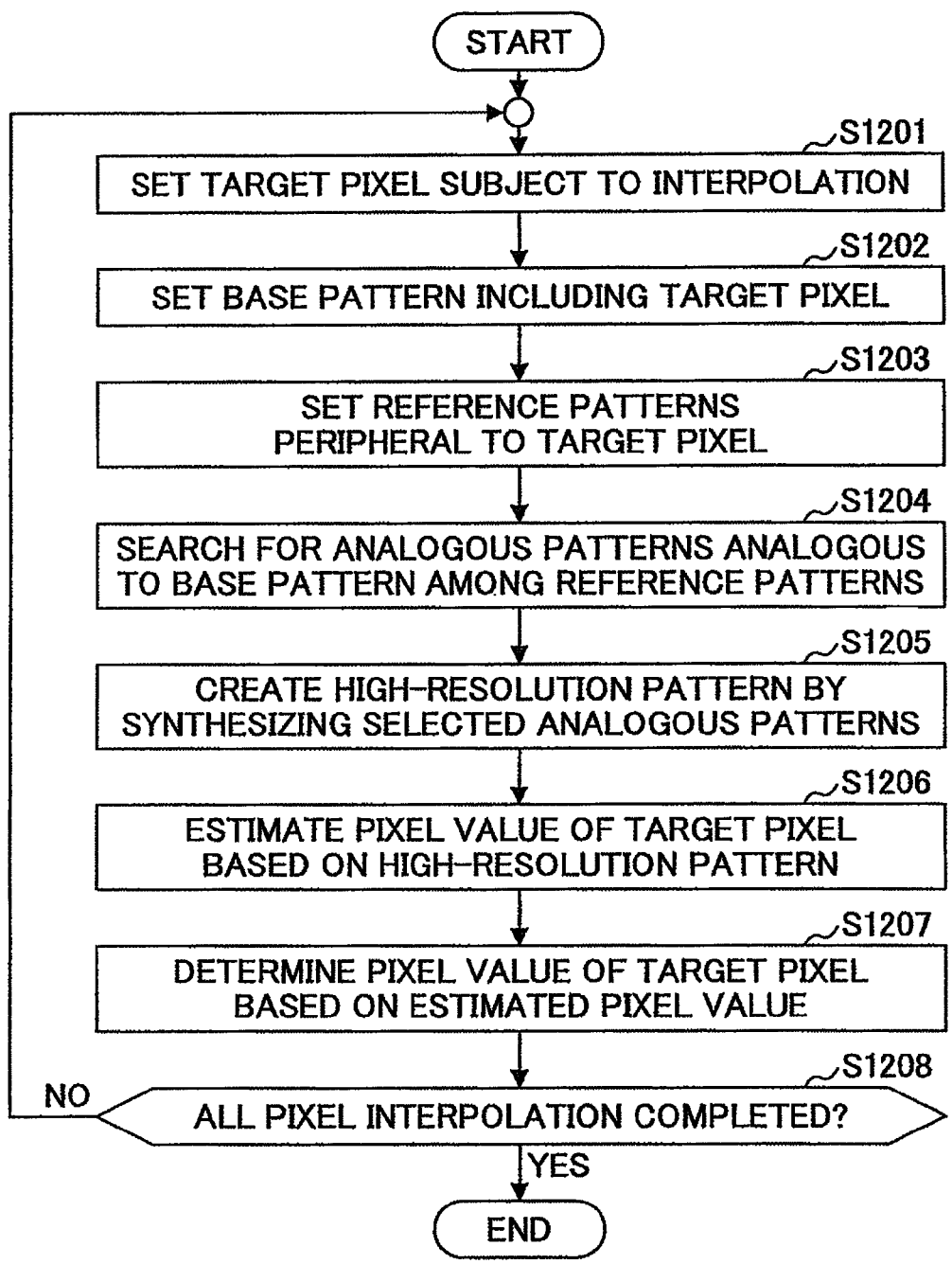
FIG. 2 is a flowchart illustrating an example of a process flow carried out by the image interpolation device illustrated in FIG. 1.

FIG. 2 is a flowchart illustrating an example of a process flow carried out by the image interpolation device illustrated in FIG. 1.

(1) Setting Target Pixel Subject to Interpolation (Step S1201)

A target pixel subject to interpolation, a pixel value of which is to be determined, is set within an image to be processed. Note that the target pixel subject to interpolation may be predetermined by a user, may be detected in advance by the image interpolation device, or may be detected every time the target pixel is set. The target pixel subject to interpolation may be detected based on predetermined luminance or color, may be detected based on the deviation from the correct value of the existing image, or may be detected based on the position at which the periodicity in the horizontal or vertical direction is discontinuous. The target pixel subject to interpolation may be an isolated dot or may be a line formed of a series of dots.

(2) Setting Base Pattern Including Target Pixel (Step S1202)

The base pattern setting section 1101 sets a region of a predetermined size including the target pixel subject to interpolation as the base pattern. The base pattern is preferably set such that the target pixel subject to interpolation is arranged at the center of the base pattern. Note that the size of the base pattern may be predetermined by the user or may be dynamically determined by the image interpolation device. The preferable size of the base pattern may be the size of one halftone dot. However, if the size of the halftone dot is an extremely small size of approximately three pixels, it is preferable that the size of the base pattern be set as a slightly larger size of one halftone dot.

The size of one halftone dot may be computed based on the periodicity of the pixel values, based on the periodicity of autocorrelation of the pixel value, or based on Fourier transformation. The computation of the size of the halftone dot based on the periodicity of the pixel values includes acquiring a line in a horizontal direction or a vertical direction and determining the width of one cycle as width or height of the halftone dot based on the periodicity of the pixel values within the acquired line. The width of one cycle may be determined as the mode of a distance between the maximum value and the minimum value of the pixels values. Note that the cycle may be computed based on plural lines.

(3) Setting Reference Patterns in Region Peripheral to the Target Pixel (Step S1203)

The reference pattern setting section 1102 sets a region having the size equal to or larger than the size of the base pattern as a reference pattern. The reference pattern may be set such that the reference pattern includes the target pixel subject to interpolation or does not include the target pixel. Further, the reference pattern may be one or may be two or more.

(4) Searching for Analogous Patterns Analogous to Base Pattern Among Reference Patterns (Step S1204)

The analogous pattern acquisition section 1103 searches for an analogous pattern analogous to the base pattern among the reference patterns and select one or more analogous patterns that satisfy a predetermined condition from the reference patterns. The analogous pattern may be searched for by pattern matching. If the analogous pattern is searched for by pattern matching, the base pattern is compared with each of the reference patterns by moving the base pattern to a corresponding position of each of the reference patterns, and evaluating a matching level (i.e., measuring the similarity) between the base pattern and the corresponding reference pattern. The patterns that satisfy a predetermined standard are determined as analogous patterns.

The evaluation of the matching level between the base pattern and the corresponding one of the reference patterns may be carried out by utilizing algorithms such as the sum of squared difference (SSD) and the sum of absolute difference (SAD) to measure correlation-based similarity or difference. If the evaluation of the matching level is determined based on the difference, the difference having a value lower than a predetermined value may be determined as the predetermined condition for determining the analogous pattern. Likewise, if the evaluation of the matching level is determined based on the similarity, the similarity having a value higher than a predetermined value may be determined as the predetermined condition for determining the analogous pattern. Note that it is preferable that the target pixel subject to interpolation be excluded from the reference patterns when the matching level between the base pattern and each of the reference patterns is evaluated. Note also that if there are pixels inapplicable to the matching level evaluation other than the target pixel subject to interpolation, it is also preferable that such inapplicable pixels be excluded from the reference patterns to be evaluated. Further, the evaluation of the matching level between the base pattern and the corresponding one of the reference patterns may also be carried out by setting a position of the integral multiple of the size of the halftone dot deviated from the base pattern as the analogous pattern.

(5) Creating High-Resolution Pattern by Synthesizing Analogous Patterns (Step S1205)

The high-resolution pattern creating section 1104 creates a high-resolution pattern by mutually aligning the analogous patterns and arranging the pixels of each of the analogous patterns in appropriate positions. Note that the high-resolution pattern may be formed by adding the base pattern to the analogous patterns. The alignment of the analogous patterns may be carried out by detecting deviations between the analogous patterns by pattern matching or phase only correlation. Note that it is preferable that the pattern matching used for the alignment of the analogous patterns be more accurate than the pattern matching used for searching for the analogous patterns. The pixels of each of the analogous patterns may be arranged by creating a high-resolution blank image in advance, and each of the analogous patterns is arranged to a corresponding one of the positions in the high-resolution blank image. Alternatively, the pixels of each of the analogous patterns may be arranged by determining one of the analogous patterns as origin, computing deviations between the central position or the left end position of the determined analogous pattern and that of the rest of the analogous patterns, and creating a list of the pixels by associating the pixel values and the deviation values. Note that the analogous patterns may be searched for simultaneously with synthesizing the analogous patterns.

(6) Estimating Pixel Value of Target Pixel Subject to Interpolation Based on High-Resolution Pattern (Step S1206)

The pixel value determining section 1105 acquires a pixel value of a pixel from the high-resolution pattern, a position of which corresponds to a position of the target pixel subject to interpolation in the base pattern, and estimates the acquired value as an estimated pixel value. If there is a pixel existing in the high-resolution pattern a position of which corresponds to the position of the target pixel subject to interpolation in the base pattern, a pixel value of such a pixel in the high-resolution pattern may simply be utilized as the estimated pixel value for the target pixel subject to interpolation. If there is no pixel existing in the high-resolution pattern, a position of which corresponds to the position of the target pixel subject to interpolation in the base pattern, the estimated pixel value may be computed by carrying out interpolation operation on the peripheral pixel values. Examples of the interpolation operation includes linear interpolation or cubic interpolation.

(7) Determining Pixel Value of Target Pixel Subject to Interpolation Based on Estimated Pixel Value (Step S1207)

The pixel value determining section 1105 may determine the estimated pixel value of the target pixel subject to interpolation as a pixel value of the intact target pixel subject to interpolation without any change or modification. However, if it is desirable to change the luminance or the hue of the target pixel in terms of compatibility between the target pixel and the peripheral pixels, the estimated pixel value may be corrected and the corrected pixel value may be determined as the pixel value of the target pixel.

(8) Executing Series of Above Pixel Interpolation Steps for All the Target Pixels Subject to Interpolation (Step S1208)

Note that if the base pattern set for one target pixel subject to interpolation includes another target pixel subject to interpolation, the high-resolution pattern created for the former target pixel subject to interpolation may also be utilized for the latter target pixel subject to interpolation.

Figure 3:
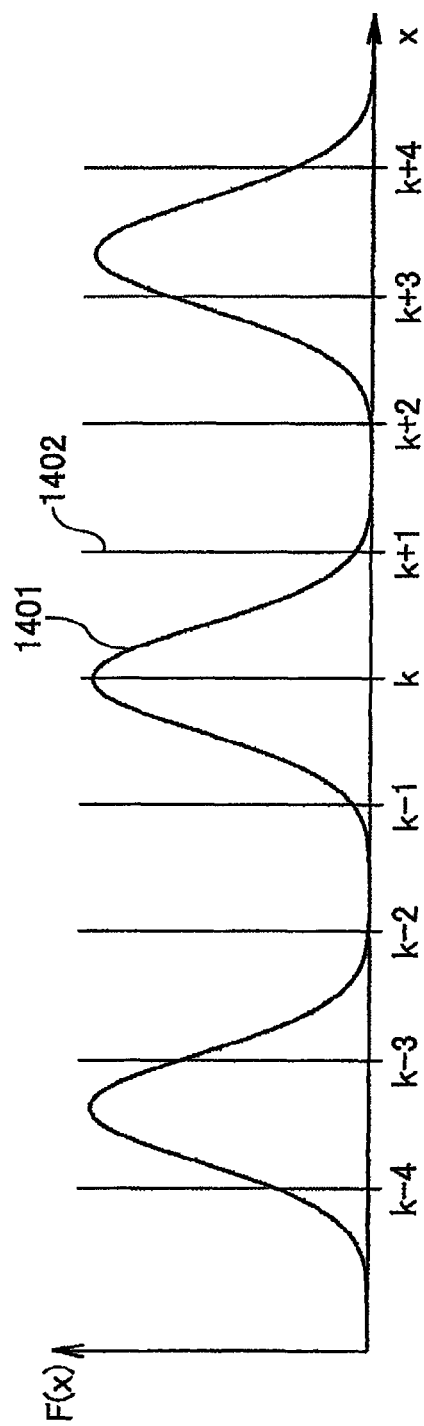
FIG. 3 is an example of a simulation diagram illustrating a one dimensionally expressed image signal in the image interpolation device illustrated in FIG. 1.
Figure 4:
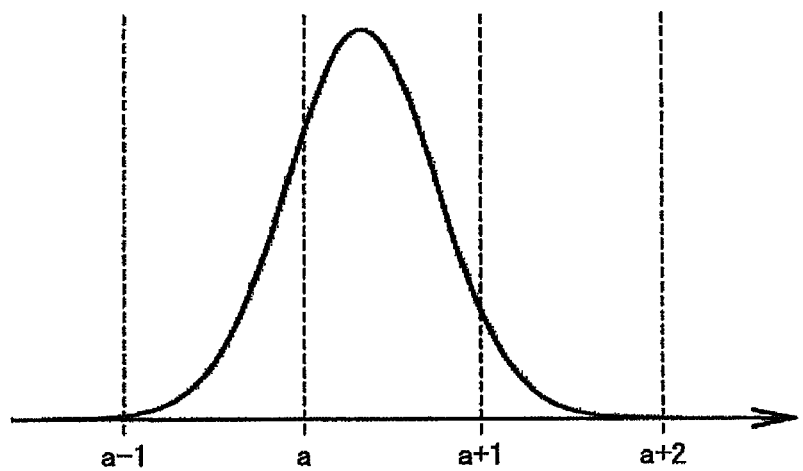
FIG. 4 is another example of a simulation diagram illustrating a one dimensionally expressed image signal in the image interpolation device illustrated in FIG. 1.
Figure 5:
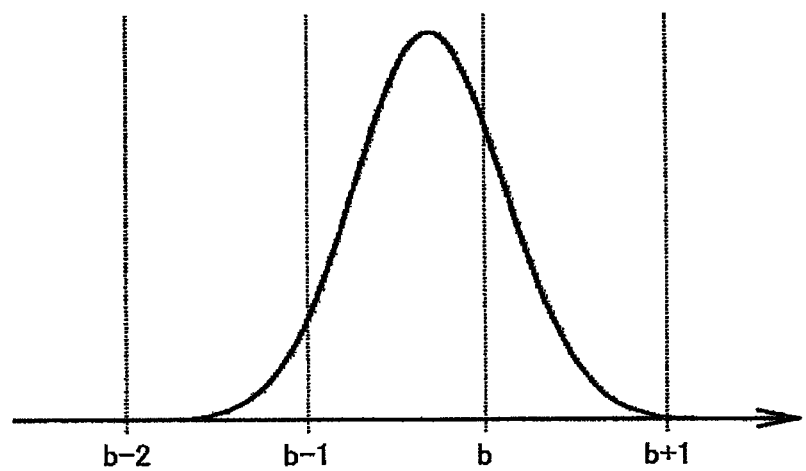
FIG. 5 is still another example of a simulation diagram illustrating a one dimensionally expressed image signal in the image interpolation device illustrated in FIG. 1.

FIGS. 3, 4 and 5 are examples of simulation diagrams illustrating a one dimensionally expressed image signal in the image interpolation device illustrated in FIG. 1. FIG. 3 is an example of a simulation diagram illustrating the one dimensionally expressed image signal at a certain position of the halftone image in a horizontal direction. In FIG. 3, the vertical axis indicates a pixel value and the horizontal axis indicates x-coordinate, on which an image signal 1401 and a virtual sampling position 1402 are expressed. FIG. 3 illustrates the image signal 1401 positioned near the x-coordinate of a k point, FIG. 4 illustrates the image signal 1401 positioned near the x-coordinate of an a point, and FIG. 5 illustrates the image signal 1401 positioned near the x-coordinate of a b point. As illustrated in FIG. 3, a sampling position of the pattern is shifted based on the x-coordinate value.

Figure 6:
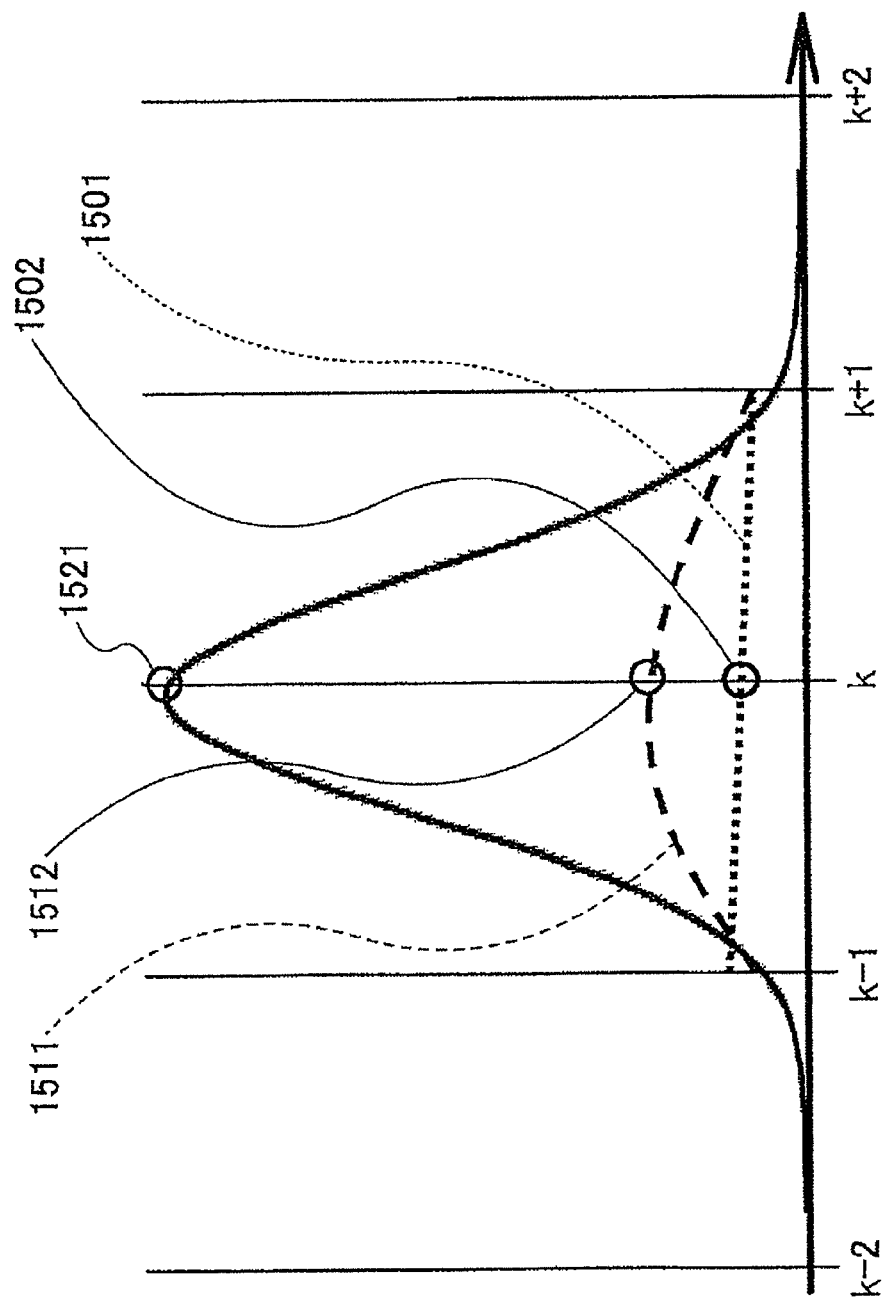
FIG. 6 is an example of a simulation diagram illustrating interpolation carried out by an ordinary interpolation method.

FIG. 6 is an example of a simulation diagram illustrating interpolation carried out by an ordinary interpolation method. FIG. 3 is the example of the simulation diagram illustrating interpolation carried out on the pixel in the x-coordinate of the k point by the ordinary interpolation method. If the pixel value of the kth pixel in the x-coordinate is computed by linear interpolation 1501, the computed pixel value of the kth pixel is indicated by 1502 in FIG. 6. If the pixel value of the kth pixel in the x-coordinate is computed by cubic interpolation 1511, the computed pixel value of the kth pixel is indicated by 1512 in FIG. 6. However, the computed pixel values obtained by the linear interpolation and cubic interpolation are both largely deviated from the true value 1521 illustrated in FIG. 6. If the pixel value of the kth pixel in the x-coordinate is computed by pattern matching, the pixel value of the kth pixel may be computed as "x=a" in FIG. 4 or "x=b" illustrated in FIG. 5. In such cases, although the computed pixel value of the kth pixel obtained by pattern matching is closer to the truth value, the computed pixel value by pattern matching may still be deviated from the truth value.

Figure 7:
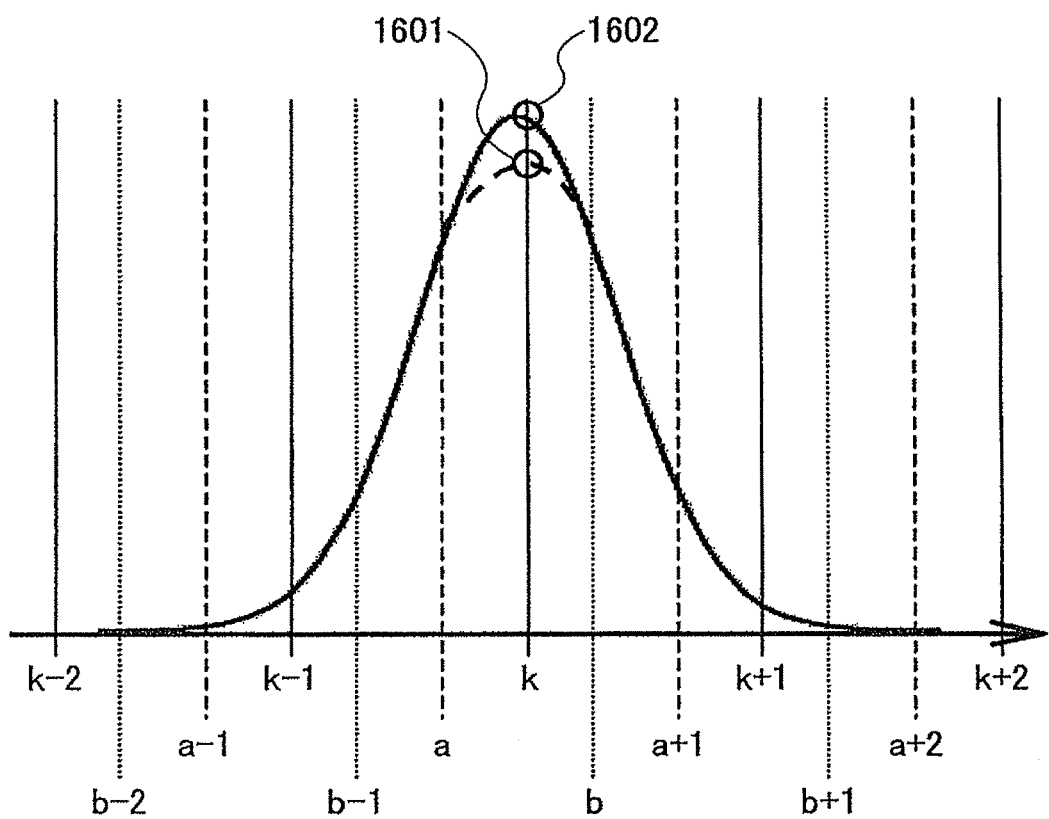
FIG. 7 is an example of a simulation diagram illustrating interpolation carried out by the image interpolation device provided in the image forming apparatus according to the first embodiment.

FIG. 7 is an example of a simulation diagram illustrating interpolation carried out by the image interpolation device provided in the image forming apparatus according to the first embodiment. Specifically, FIG. 7 is a simulation diagram obtained based on the pixel value computed by the cubic interpolation in which a high-resolution pattern is created by synthesizing the image signals illustrated in FIGS. 4 and 5 and the pixel value is computed by the cubic interpolation based on the obtained high-resolution pattern. In FIG. 7, broken lines and dotted lines indicate positions at which the pixels of the analogous patterns are arranged. As is clear from FIG. 7, the number of pixels expressing one halftone dot is increased, which has increased the resolution of the image (high-resolution image). Further, since the cubic interpolation is conducted based on the high-resolution pattern, the computed pixel value 1601 has approached the true value 1602 as illustrated in FIG. 7. Accordingly, the interpolation accuracy is significantly improved compared to the ordinary interpolation illustrated in FIG. 6. In addition, if a high-resolution pattern is created based on the base pattern and the analogous patterns and the cubic interpolation is carried out based on such a high resolution pattern, the resolution of the image may be further increased.

[Second Embodiment]

Figure 8:
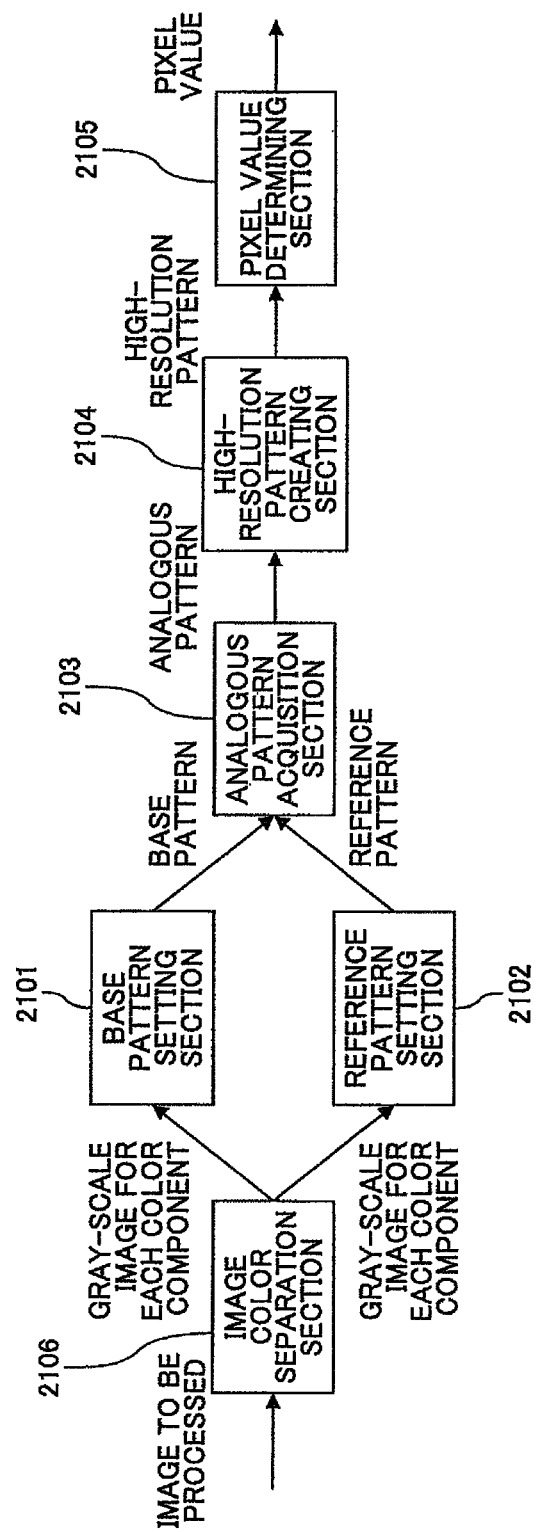
FIG. 8 is a functional block diagram illustrating functional components of an image interpolation device provided in an image forming apparatus according to a second embodiment.

FIG. 8 is a functional block diagram illustrating functional components of an image interpolation device provided in an image forming apparatus according to a second embodiment. The image interpolation device includes an image color separation section 2106 configured to decompose an input image to be processed into gray-scale images of respective color components; a base pattern setting section 2101 configured to set a base pattern of a predetermined size including a set target pixel subject to interpolation of a designated one of the gray-scale images of respective color components; a reference pattern setting section 2102 configured to set one or more reference patterns of the same size or a larger size that does not contain another target pixel subject to interpolation in an area peripheral to the target pixel subject to interpolation; an analogous pattern acquisition section 2103 configured to acquire one or more analogous patterns analogous to the base pattern from the reference patterns; a high-resolution pattern creating section 2104 configured to create a high resolution pattern having a predetermined value or above by synthesizing the acquired analogous patterns; and a pixel value determining section 2105 configured to estimate a pixel value of the target pixel subject to interpolation for each of the color components at a corresponding position based on the created high-resolution pattern and determine a pixel value of the target pixel subject to interpolation for each of the color components by synthesizing the estimated pixel values of the respective color components.

Figure 9:
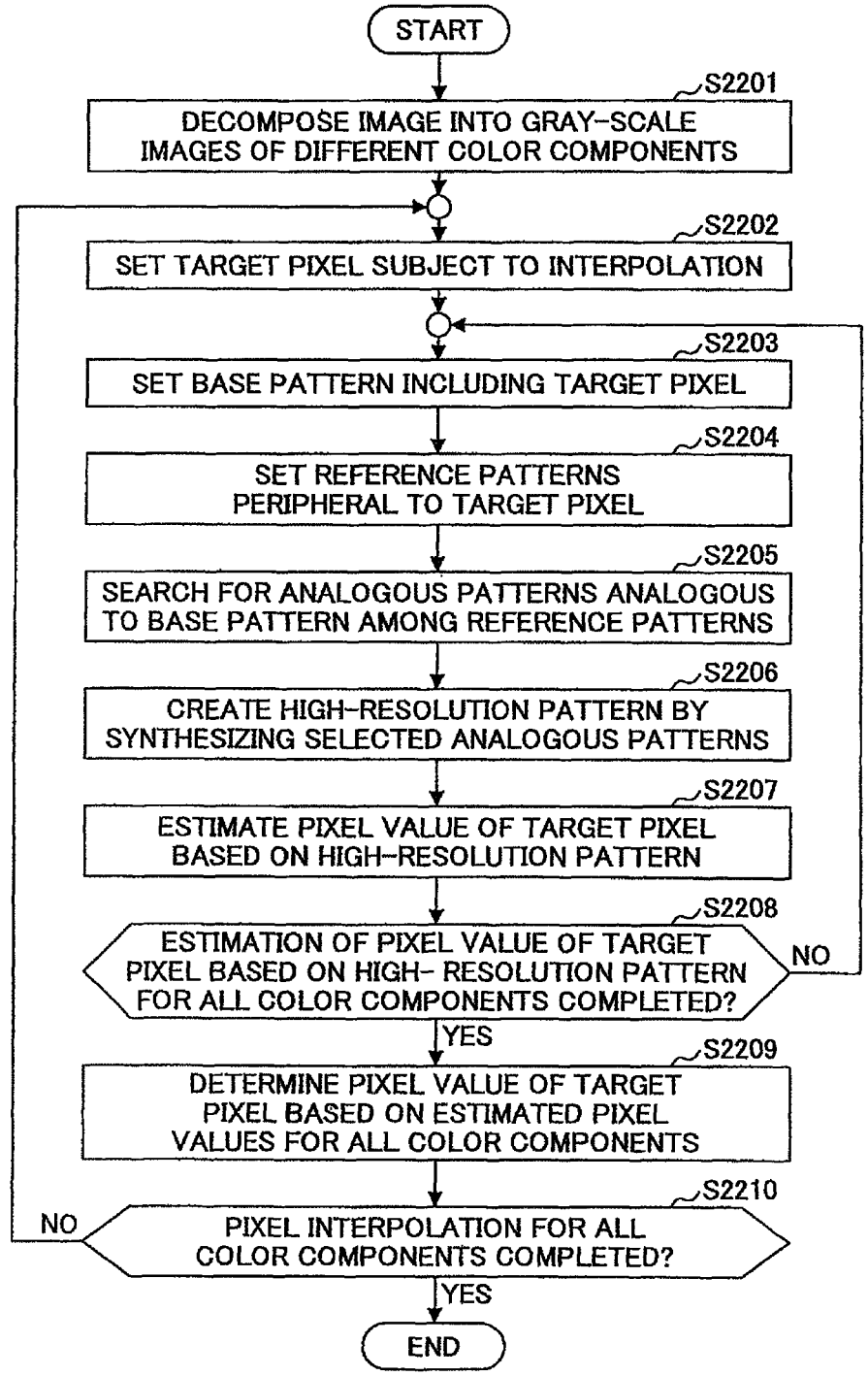
FIG. 9 is a flowchart illustrating an example of a process flow carried out by the image interpolation device illustrated in FIG. 8.

FIG. 9 is a flowchart illustrating an example of a process flow carried out by the image interpolation device illustrated in FIG. 8.

(1) Decomposing Image into Gray-Scale Images of Different Color Components (Step S2201)

The image color separation section 2106 decomposes an image into gray-scale images of different color components if the input image to be processed is a color image. As a color component model, a CMYK color model or LAB color space model suitable for a subsequent process may be utilized other than the RGB color model. If the RGB (red, green and blue) color space is used, three gray-scale images of R, G and B color components are created. Note that the processes (3) through (7) (i.e., steps S2203 through S2207 in this case) are repeated for each of the gray-scale images of respective color components. Note that since the process (2) (i.e., step S2202 in this case) is common to all the color components, the process (2) may be conducted once. Since the processes (2) through (7) are the same as those in the first embodiment (i.e., steps S1202 to S1207 in the first embodiment), the descriptions for these processes are omitted; however, the description of the process (7) (i.e., step S2207) is partially added.

(2) Setting Target Pixel Subject to Interpolation (Step S2202)

(3) Setting Base Pattern Including Target Pixel (Step S2203)

(4) Setting Reference Patterns in Region Peripheral to the Target Pixel (Step S2204)

(5) Searching for Analogous Patterns Analogous to Base Pattern Among Reference Patterns (Step S2205)

(6) Creating High-Resolution Pattern by Synthesizing Analogous Patterns (Step S2206)

(7) Estimating Pixel Value of Pixel Corresponding to Position of Target Pixel Subject to Interpolation Based on High-Resolution Pattern (Step S2207)

The estimated pixel values determined by the pixel value determining section 2105 may be obtained from the respective color components of the gray-scale images or may be obtained from all the color components of each of the gray-scale images. The details of the estimated pixel value are described below.

(8) Conducting the Processes (3) through (7) on Each of Gray-Scale Images of All the Color Components (Step S2208)

The processes (3) through (7) are conducted on each of the gray-scale images obtained by decomposing the input image in the process (2), such that the estimated pixel value corresponding to a position of the target pixel subject to interpolation may be obtained from respective color components of the gray-scale images.

(9) Determining Pixel Value of Target Pixel Subject to Interpolation Based on Estimated Pixel Value (Step S2209)

The pixel value determining section 2105 further creates one pixel value by synthesizing the respective estimated pixel values obtained from all the color components and determines the synthesized pixel value as the pixel value of the target pixel subject to interpolation. The estimated pixel values may be synthesized by computing the mean or the weighted mean of all the estimated pixel values, or by extracting the respective color components from the estimated pixel values based on the different color components and utilizing the extracted color components as a color component of the target pixel subject to interpolation.

(10) Conducting the Processes (2) through (9) on All the Target Pixels Subject to Interpolation (Step S2210)

Note that the process (1) may be conducted once.

When the estimated value is obtained for each of the color components and the obtained estimated values of the respective color components are synthesized, the halftone image having halftone dots with different sets of lines per inch or different screen angles may be obtained. In such a case, optimal estimated pixel values are obtained from respective colors such that the optimal pixel values for all the halftone dots of respective colors may be obtained by synthesizing the optimal estimated pixel values of the respective colors. Accordingly, even if the input image to be processed is a color image, the interpolation may be carried out with high accuracy.

Figure 10:
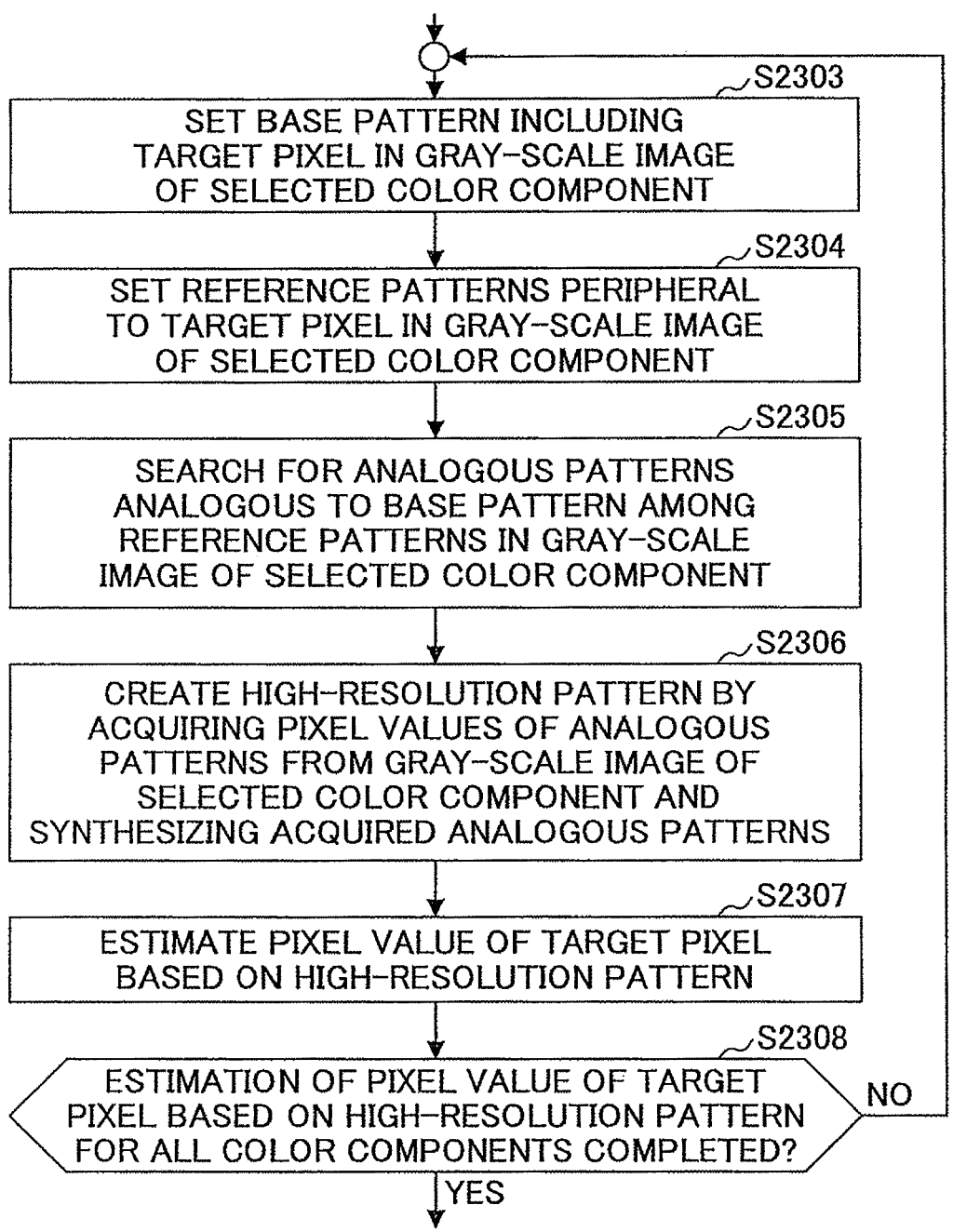
FIG. 10 is a flowchart illustrating details of the process flow in FIG. 9 in which a color component corresponding to a gray-scale image is computed as an estimated pixel value.

FIG. 10 is a flowchart illustrating details of the process flow in FIG. 9 in which a color component corresponding to a gray-scale image is computed as an estimated pixel value.

(1) Setting Base Pattern Including Target Pixel Subject to Interpolation in Gray-Scale Image of Selected Color Component (Step S2303)

The base pattern setting section 2101 sets the base pattern in the gray-scale image of a currently selected color component.

(2) Setting Reference Patterns in Gray-Scale Image of Selected Color Component Corresponding to Region Peripheral to Target Pixel Subject to Interpolation (Step S2304)

The reference pattern setting section 2102 sets the reference patterns in the gray-scale image of the currently selected color component.

(3) Searching for Analogous Patterns Analogous to Base Pattern Among Reference Patterns (Step S2305)

The analogous pattern acquisition section 2103 searches for analogous patterns analogous to the base pattern among the reference patterns.

(4) Creating High-Resolution Pattern by Acquiring Pixel Values of Pixels Corresponding to Positions of the Analogous Patterns from Fray-Scale Image having the Selected Color Component and Synthesizing the Acquired Pixel Values (Step S2306)

The high-resolution pattern creating section 2104 creates a high-resolution pattern by acquiring pixel values corresponding to the positions of the analogous patterns from the gray-scale image of the currently selected color component and synthesizing the acquired pixel values. That is, the high-resolution pattern created as above is composed based on the gray-scale image of the selected color component to be processed. For example, if an R component of the gray-scale image is to be processed, the high-resolution pattern is created based on the gray-scale image that has the R component alone.

(5) Estimate Pixel Values of Pixel Based on Created High-Resolution Pattern Corresponding to Position of Target Pixel Subject to Interpolation (Step S2308)

The pixel value determining section 2105 determines the estimated pixel value by acquiring the pixel value of the selected color component of the gray-scale image corresponding to a position of the target pixel subject to interpolation from the high-resolution pattern. That is, the estimated value determined as above is obtained based on the selected color component.

(6) Conducting the Processes (1) through (5) on Each of Gray-Scale Images of All the Color Components (Step S2310)

Figure 11:
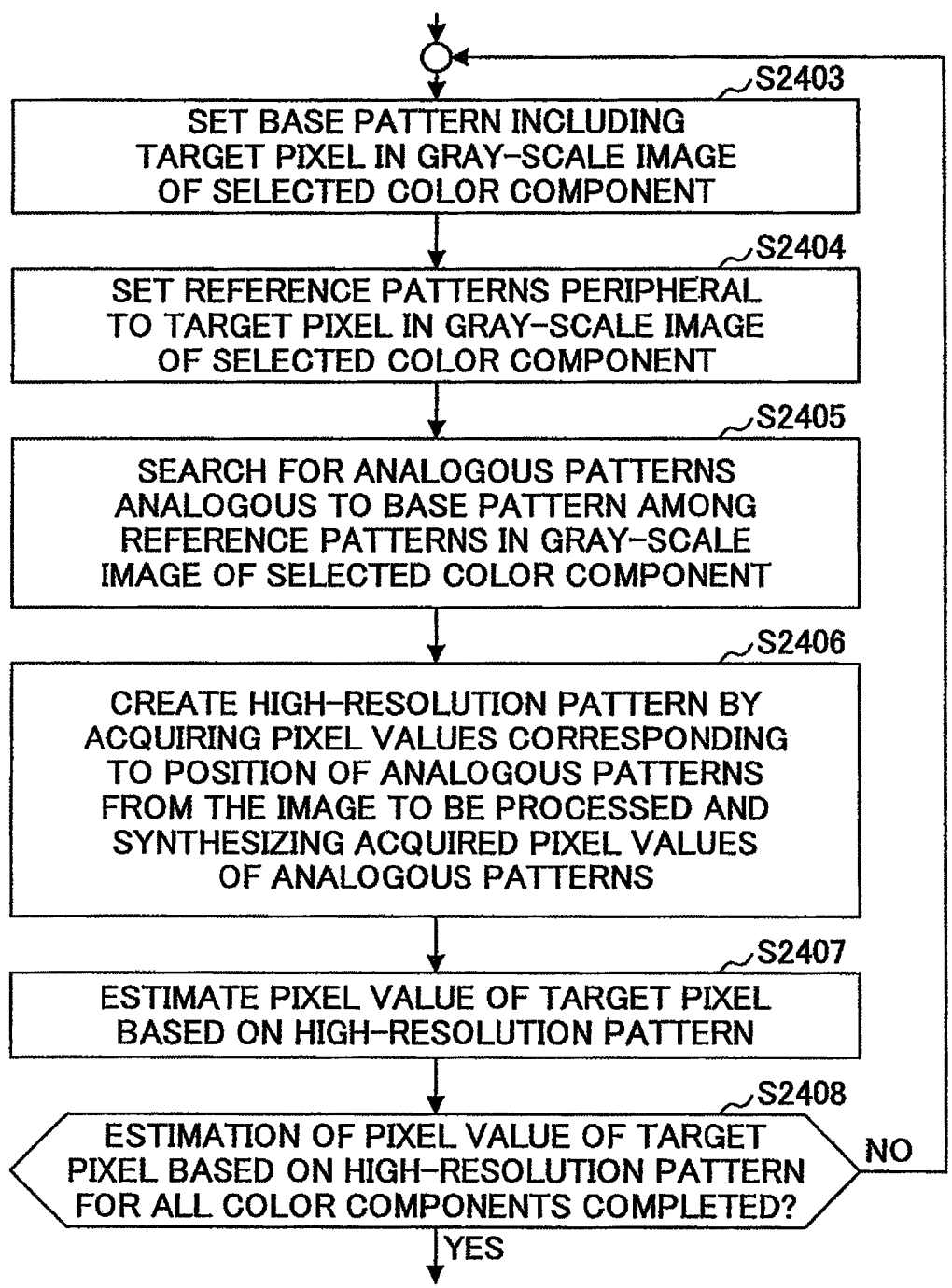
FIG. 11 is a flowchart illustrating details of the process flow in FIG. 9 in which all the color components corresponding to gray-scale images are computed as estimated pixel values.

FIG. 11 is a flowchart illustrating details of the process flow in FIG. 9 in which estimated pixel values are computed based on all the color components of each of the gray-scale images.

(1) Setting Base Pattern Including Target Pixel Subject to Interpolation in Gray-Scale Image of Selected Color Component (Step S2403)

The base pattern setting section 2101 sets the base pattern in the gray-scale image of a currently selected color component.

(2) Setting Reference Patterns Corresponding to Region Peripheral to Target Pixel Subject to Interpolation in Gray-Scale Image of Selected Color Component (Step S2404)

The reference pattern setting section 2102 sets the reference patterns in the gray-scale image of the currently selected color component.

(3) Searching for Analogous Patterns Analogous to Base Pattern Among Reference Patterns (Step S2405)

The analogous pattern acquisition section 2103 searches for analogous patterns analogous to the base pattern among the reference patterns.

(4) Creating High-Resolution Pattern by Acquiring Pixel Values Corresponding to Positions of Analogous Patterns from Image to be Processed and Synthesizing the Acquired Pixel Values (Step S2406)

The high-resolution pattern creating section 2104 creates a high-resolution pattern by acquiring pixel values corresponding to positions of the analogous patterns from the image to be processed and synthesizing the acquired pixel values. That is, the high-resolution pattern created as above includes color components identical to the selected color components of the image to be processed. For example, if the image to be processed is decomposed into RGB color components, the high-resolution pattern includes RGB color components.

(5) Estimate Pixel Values Corresponding to Target Pixel Subject to Interpolation Based on High-Resolution Pattern (Step S2407)

The pixel value determining section 2105 acquires pixel values corresponding to the target pixel subject to interpolation based on the created high-resolution pattern having the RGB color components and determines the acquired pixel values as estimated pixel values for the RGB color components. That is, the estimated values include the same color components as those of the high-resolution pattern.

(6) Conducting the Processes (1) through (5) on Each of Gray-Scale Images of All the Color Components (Step S2408)

To summarize the similarities and differences between the processes of FIG. 10 and those of FIG. 11 are as follows. The similarities:

Setting method of the base pattern
Setting method of the reference patterns
Setting method of the analogous patterns The differences:

Synthesizing method for the high-resolution patterns

In FIG. 10, the pixel values corresponding to analogous patterns are acquired from the gray-scale images whereas the pixel values corresponding to analogous patterns are acquired from the image to be processed.

Thus, the high-resolution pattern in FIG. 10 includes one color component corresponding to the gray-scale image whereas the high-resolution pattern in FIG. 11 includes all the color components corresponding to the image to be processed.

Determining method for estimated values

The estimated pixel value is acquired from the high-resolution pattern including one color component and the estimated pixel value includes one color component corresponding to the gray-scale image in FIG. 10. However, in FIG. 11, the estimated value is obtained from all the color components contained in the high-resolution pattern, and the estimated values include all the color components contained in the image to be processed. Thus, three estimated values are acquired from the respective color components of the gray-scale images in FIG. 10, whereas three estimated values each include all the color components of the image to be processed in FIG. 11.

Specifically, the R component of the gray-scale image is processed based on the high-resolution pattern formed of the gray-scale image having the R color component and the estimated pixel value is a value of the R color component in FIG. 10. By contrast, when the R component of the gray-scale image is processed based on the high-resolution pattern that is the color image having the RGB color components and the estimated pixel values are obtained from the RGB color components of the color image in FIG. 11. There may be a similar difference between processes of FIG. 10 and FIG. 11 when the G or B color component of the gray-scale image is processed.

Such processes illustrated in FIG. 11 may be required in the following case. Since the pixel values are separately computed based on the R, G and B color components of the gray-scale images and the separately obtained RGB color values are used as an RGB value of the target pixel subject to interpolation, the luminance or hues may be deviated from the peripheral pixels. This is because the R, G and B values are independently computed, and the R, G and B values include different estimated errors as a result. However, if the RGB values are computed based on each of the gray-scale images having the respective color components and the computed three RGB values are synthesized as illustrated in FIG. 11, such different estimated errors of the R, G and B values may not be obtained.

[Third Embodiment]

Figure 12:
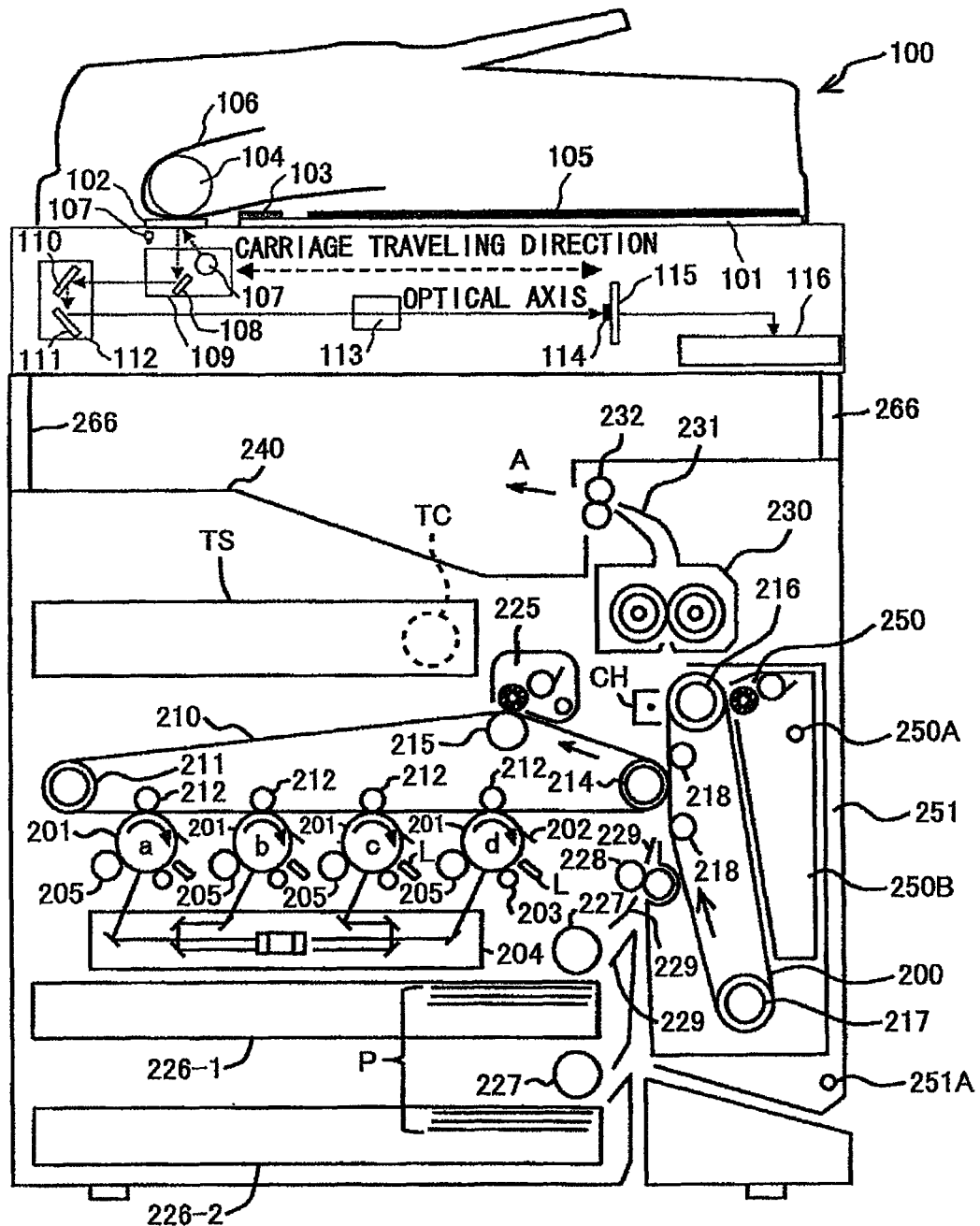
FIG. 12 is a diagram illustrating an example of the image forming apparatus including the image interpolation device illustrated in FIG. 1.

FIG. 12 is a diagram illustrating an example of the image forming apparatus including the image interpolation device illustrated in FIG. 1. An example of an image reader utilized in the image forming apparatus according to a third embodiment is disclosed in Japanese Patent Application Publication No. 2005-77520. The image reader includes a contact glass 101 on which a document 105 is placed; a sheet-through reading window 102; a standard white board 103 utilized for adjusting a white level or generating shading correction data; a first carriage 109 having a light source 107 emitting light onto the document 105 and a first mirror 108; a second carriage 112 having a second mirror 110 and a third mirror 111; a home positioning sensor (hereinafter referred to as "HPS") 1117 configured to detect positions of the first and the second carriages 109 and 112; an image reader circuit 115 having a CCD image sensor (hereinafter referred to as "CCD"); an image processing circuit 116 having a not-illustrated image interpolation device; a not-illustrated scanner drive motor configured to drive the first and the second carriages 109 and 112; and a not-illustrated document sensor.

The image reader having the above configuration may include two types of reading systems to read the document 105 placed on the contact glass 101. In the first reading system, when the document is placed on the contact glass 101, the light source 107 is illuminated and a control signal from a not-illustrated controller drives the scanner drive motor to rotate so as to move the first carriage 109 and the second carriage 112 in a right direction in FIG. 12 while scanning image data on the document 105. In the second reading system, another document 106 is transferred by a document transfer device 104 via a sheet-through reading window 102 and the light source 107 is illuminated to emit light on the transferred document 106 without allowing the first carriage 109 and the second carriage 112 to move in the right direction (the first carriage 109 and the second carriage 112 are unmoved) while scanning image data on the document 106.

Before the first carriage 109 scans the document 105, the shading correction data generated from the standard white board 103 are stored in a memory. The image data on the document 105 is normalized with the shading correction data stored in the memory to correct non-uniform distribution of light or inconsistent sensitivity of the CCD in the image reader. Accordingly, the image reader reads the image data on the document 105 with high quality.

The image data normalized with the shading correction data are output to a not-illustrated image processing unit. When the image data on the document 106 is read without allowing the first carriage to move while transferring the document 106 (i.e., sheet-through reading system), the first carriage 109 moves under the standard white board 103 to generate the shading correction data and then moves back to the sheet-through reading position before reading the document 105. The first carriage 109 then initiates reading the document 105.

Next, an example of the image forming apparatus according to the third embodiment is described with reference to FIG. 12. Rotationally supported photoreceptors 201 configured to rotate in directions indicated by arrows in FIG. 12 include static eliminators L, cleaner devices 202, charger devices 203 and developing devices 205 on their outer peripheries.

A space is provided between the charger device 203 and developing device 205 provided on the periphery of the photoreceptor 201 such that light emitted from the exposure device 204 is emitted through the space between the charger device 203 and developing device 205. As illustrated in FIG. 12, there are four photoreceptors 201a, 201b, 201c, and 201d that include the same components on their outer periphery except for toner colors processed by the developing devices 205.

The photoreceptor 201 is formed of a cylindrical aluminum surface having a diameter range of 30 to 100 mm, and an organic semiconductor layer made of a photoconductive material formed on the cylindrical aluminum surface. The organic semiconductor layer is partially attached to an intermediate transfer belt 210.

The intermediate transfer belt 210 is looped over rollers 211, 212, 214 and 215 rotationally travelling along a direction indicated by an arrow in FIG. 12. The first roller 211 utilized as a first transfer unit is arranged near the photoreceptor 201 inside the loop of the intermediate transfer belt 210 to transfer an image on the photoreceptor 210 onto the intermediate transfer belt 210.

Outside the loop of the intermediate transfer belt 210, a rear-surface intermediate transfer belt cleaner device 250 is arranged at a downstream position at which the image is transferred from the intermediate transfer belt 210 to a recording medium or to the rear-surface intermediate transfer belt 200. The rear-surface intermediate transfer belt cleaner device 250 includes a brush roller configured to remove residual toner from a surface of the rear-surface intermediate transfer belt 200 after the image is transferred from the intermediate transfer belt 210.

In FIG. 12, the brush roller of the rear-surface intermediate transfer belt cleaner device 250 is separate from the surface of the rear-surface intermediate transfer belt 200. The brush roller is movably arranged at a fulcrum 250A as a center and detachably arranged on the surface of the rear-surface intermediate transfer belt 200. The roller brush is located at a position separate from the rear-surface intermediate transfer belt 200 when the toner image is carried by the rear-surface intermediate transfer belt 200, that is, before the toner image transferred from the intermediate transfer belt 210 is transferred to the recording medium P. The roller brush is pivotally moved in a counterclockwise direction in FIG. 12 to a position in contact with the rear-surface intermediate transfer belt 200 when the image is transferred to the recording medium P and the rear-surface intermediate transfer belt 200 needs cleaning. The removed residual toner is collected in a toner container 250B.

The exposure device 204 is configured to emit laser light with a laser system known to the art. The exposure device 204 emits light information corresponding to full-color image formation as a latent image onto a uniformly charged surface of the photoreceptor 201. The exposure device 204 may be an exposure device formed of an LED array and an image forming unit.

Thus, the above photoreceptors 201, the cleaner devices 202, the charger devices 203, the exposure device 204, the developing devices 205, the static eliminators L, and rollers 202 may serve as an image forming unit to form a toner image on the intermediate transfer belt 210.

The intermediate transfer belt 210 may be formed of a resin film or rubber as a base having a thickness range of 50 to 600 μm. The intermediate transfer belt 210 may have the resistance capable of transferring toner from the photoreceptors 201. The rear-surface intermediate transfer belt 200 is arranged on the right hand side of the intermediate transfer belt 210 in FIG. 12. The rear-surface intermediate transfer belt 200 is looped over rollers 216, 217, 218 and 219 that rotationally support along a direction indicated by the arrow in FIG. 12, and a second transfer unit 220 is arranged inside the loop of the rear-surface intermediate transfer belt 200. The rear-surface intermediate transfer belt cleaner device 250 and a charger CH are arranged outside the loop of the rear-surface intermediate transfer belt 200.

The intermediate transfer belt 210 is brought into contact with the rear-surface intermediate transfer belt 200 by the second transfer unit 220, the rollers 218 and the roller 214 supporting the intermediate transfer belt 210 to form a predetermined transfer nip.

The rear-surface intermediate transfer belt 200 may be formed of a resin film or rubber as a base having a thickness range of 50 to 600 μm. The rear-surface intermediate transfer belt 200 may have the resistance capable of transferring toner from the photoreceptors 210.

The recording media (paper) P are contained in paper feeders (paper feeder cassettes) 226-1 and 226-2 arranged at a lower side in FIG. 12. The uppermost paper is transferred by a paper feed roller 227 one by one to a resist roller pair 228 via plural guides 229. A fixing heater unit 230, a paper discharge guide pair 231, a paper discharge roller pair 232 and a paper discharge stack unit 240 are arranged on a downstream side of the transferring position of the recording media P.

A supplemental toner container TS containing supplemental toner is arranged below the paper discharge stack unit 240 and above the intermediate transfer belt 210 in FIG. 12. The toner includes four colors of magenta, cyan, yellow and black contained in a cartridge TC. A corresponding color of toner is appropriately provided from the cartridge TC to a corresponding developing device.

A frame 251 forming part of a main body of the image forming apparatus is configured to rotate and open based on an opening-closing fulcrum 251A as a center. When a user opens the frame 251, a transfer path of the recording media is widened to facilitate the user to collect or remove the jammed recording media (paper).

Further, the image reader is arranged above the main body of the image forming apparatus configured to form an image on the recording media P via a supporting unit 266 as illustrated in FIG. 12. Accordingly, the main body of the image forming apparatus may make copies of the image read by the image reader on the recording media P.

The image reader includes an operation and display unit (utilized as display unit and input unit) on the outer periphery of the image reader. The operation and display unit may include a touch panel to receive operational inputs from the user and may also display operation information to the user. The user sets various operations such as initiating copying or switching of a single side or double side copying operation, settings of the number of copies, and switching of a copying function and a printer function.

According to the embodiments described above, a high-resolution pattern is created by synthesizing one or more analogous patterns analogous to a base pattern having a target pixel subject to interpolation and a correct pixel value is estimated based on the high-resolution pattern. Accordingly, the image forming apparatus may be capable of conducting pixel interpolation with high accuracy for interpolating a certain pixel of a halftone image.

Further, according to the embodiments, since the high-resolution pattern is created by synthesizing analogous patterns, information on sampled pixels sampled at sampling positions differing from positions of the base patterns may be effectively utilized. Accordingly, the image forming apparatus may be capable of conducting pixel interpolation with high accuracy for interpolating a certain pixel of a halftone image.

Further, according to the embodiments, since the pixel information sampled at the positions differing from the base patterns is effectively utilized, analogous patterns may not be searched for a wider range of the image region, and the same effect may be obtained by referring to a narrow range of the image region. Accordingly, the image forming apparatus may be capable of conducting pixel interpolation with high accuracy for interpolating a certain pixel of a halftone image.

Accordingly, the image forming apparatus according to the embodiments described above may be capable of conducting pixel interpolation with high accuracy for interpolating a certain pixel of a halftone image.

According to an embodiment, there is provided an image forming apparatus including an image interpolation unit configured to compute a correct pixel value of a target pixel subject to interpolation of a halftone image. The image interpolation unit includes a base pattern setting unit configured to set a base pattern including the target pixel subject to interpolation; a reference pattern setting unit configured to set at least one reference pattern in a region peripheral to the target pixel subject to interpolation, the reference pattern having a size equal to or larger than a size of the base pattern; an analogous pattern acquisition unit configured to acquire at least one analogous pattern analogous to the base pattern from the reference pattern; a high-resolution pattern creating unit configured to create a high-resolution pattern having a predetermined resolution or higher by synthesizing the acquired one or more analogous patterns; a pixel value estimating unit configured to compute an estimated pixel value of the target pixel subject to interpolation based on the created high-resolution pattern; and a pixel value determination unit configured to determine the correct pixel value of the target pixel subject to interpolation based on the computed estimated pixel value of the target pixel subject to interpolation.

According to an embodiment, the image interpolation unit further includes a halftone dot size estimation unit configured to estimate at least one of a width and a height of a halftone dot as a size of the halftone dot. In the image interpolation unit, the base pattern setting unit determines the size of the base pattern based on the estimated size of the halftone dot.

In the image interpolation unit, the high-resolution pattern creating unit creates the high-resolution pattern by synthesizing the base pattern in addition to the acquired analogous pattern.

In the image interpolation unit, the pixel value estimating unit computes the estimated pixel value of the target pixel subject to interpolation by utilizing a pixel value corresponding to a position of the target pixel subject to interpolation obtained in the created high-resolution pattern without any change, or by utilizing a pixel value corresponding to a position of a pixel near the target pixel subject to interpolation obtained in the created high-resolution pattern.

In the image interpolation unit, when the pixel value estimating unit computes the estimated pixel value of the target pixel subject to interpolation by utilizing the pixel value corresponding to the position of a pixel near the target pixel subject to interpolation obtained in the created high-resolution pattern, the pixel value estimating unit utilizes linear interpolation or polynomial interpolation for computing the estimated pixel value of the target pixel subject to interpolation.

In the image interpolation unit, the base pattern, the analogous pattern, and the high-resolution pattern are formed of a one-dimensional pattern or a two-dimensional pattern.

According to an embodiment, the image interpolation unit further includes an image separation unit configured to decompose colors of the halftone image into images of different color components. In the image interpolation unit, the pixel value estimating unit computes the estimated pixel value based on the different color components of the decomposed images, and the pixel value determination unit determines the correct pixel value of the target pixel subject to interpolation based on the estimated pixel value computed based on the different color components of the decomposed images.

According to an embodiment, there is provided a method for computing a correct pixel value of a target pixel subject to interpolation of a halftone image. The method includes setting a base pattern including the target pixel subject to interpolation; setting at least one reference pattern in a region peripheral to the target pixel subject to interpolation, the reference pattern having a size equal to or larger than a size of the base pattern; acquiring at least one analogous pattern analogous to the base pattern from the reference pattern; creating a high-resolution pattern having a predetermined resolution or higher by synthesizing the acquired one or more analogous patterns; computing an estimated pixel value of the target pixel subject to interpolation based on the created high-resolution pattern; and determining the correct pixel value of the target pixel subject to interpolation based on the computed estimated pixel value of the target pixel subject to interpolation.

According to an embodiment, the method further includes estimating at least one of a width and a height of a halftone dot as a size of the halftone dot. In this method, the size of the base pattern is determined based on the estimated size of the halftone dot.

In this method, the high-resolution pattern is created by synthesizing the base pattern in addition to the acquired analogous pattern.

In this method, the estimated pixel value of the target pixel subject to interpolation is computed by utilizing a pixel value corresponding to a position of the target pixel subject to interpolation obtained in the created high-resolution pattern without any change, or by utilizing a pixel value corresponding to a position of a pixel near the target pixel subject to interpolation obtained in the created high-resolution pattern.

In this method, when the estimated pixel value of the target pixel subject to interpolation is computed by utilizing the pixel value corresponding to the position of the pixel near the target pixel subject to interpolation obtained in the created high-resolution pattern, one of linear interpolation and polynomial interpolation is utilized for computing the estimated pixel value of the target pixel subject to interpolation.

In this method, the base pattern, the analogous pattern, and the high-resolution pattern are formed of a one-dimensional pattern or a two-dimensional pattern.

According to an embodiment, the method further includes decomposing colors of the halftone image into images of different color components. In the method, the estimated pixel value is computed based on the different color components of the decomposed images, and the correct pixel value of the target pixel subject to interpolation is determined based on the estimated pixel value computed based on the different color components of the decomposed images.

Embodiments of the present invention have been described heretofore for the purpose of illustration. The present invention is not limited to these embodiments, but various variations and modifications may be made without departing from the scope of the present invention. The present invention should not be interpreted as being limited to the embodiments that are described in the specification and illustrated in the drawings.

The present application is based on Japanese priority application No. 2010-200697 filed on Sep. 8, 2010, with the Japanese Patent Office, the entire contents of which are hereby incorporated by reference.

What is claimed is:

1. An image forming apparatus comprising an image interpolation unit configured to compute a correct pixel value of a target pixel subject to interpolation of a halftone image, wherein the image interpolation unit includes:
a base pattern setting unit configured to set a base pattern including the target pixel subject to interpolation;
a reference pattern setting unit configured to set at least one reference pattern in a region peripheral to the target pixel subject to interpolation, the reference pattern having a size equal to or larger than a size of the base pattern;
an analogous pattern acquisition unit configured to acquire at least one analogous pattern analogous to the base pattern from the reference pattern;
a high-resolution pattern creating unit configured to create a high-resolution pattern having a predetermined resolution or higher by synthesizing the acquired one or more analogous patterns;
a pixel value estimating unit configured to compute an estimated pixel value of the target pixel subject to interpolation based on the created high-resolution pattern; and
a pixel value determination unit configured to determine the correct pixel value of the target pixel subject to interpolation based on the computed estimated pixel value of the target pixel subject to interpolation, and
wherein the image interpolation unit further includes a halftone dot size estimation unit configured to estimate at least one of a width and a height of a halftone dot as a size of the halftone dot, and wherein the base pattern setting unit determines the size of the base pattern based on the estimated size of the halftone dot.

2. The image forming apparatus as claimed in claim 1, wherein the high-resolution pattern creating unit creates the high-resolution pattern by synthesizing the base pattern in addition to the acquired analogous pattern.

3. The image forming apparatus as claimed in claim 1, wherein the pixel value estimating unit computes the estimated pixel value of the target pixel subject to interpolation by utilizing a pixel value corresponding to a position of the target pixel subject to interpolation obtained in the created high-resolution pattern without any change, or by utilizing a pixel value corresponding to a position of a pixel near the target pixel subject to interpolation obtained in the created high-resolution pattern.

4. The image forming apparatus as claimed in claim 3, wherein when the pixel value estimating unit computes the estimated pixel value of the target pixel subject to interpolation by utilizing the pixel value corresponding to the position of a pixel near the target pixel subject to interpolation obtained in the created high-resolution pattern, the pixel value estimating unit utilizes linear interpolation or polynomial interpolation for computing the estimated pixel value of the target pixel subject to interpolation.

5. The image forming apparatus as claimed in claim 1, wherein the base pattern, the analogous pattern, and the high-resolution pattern are formed of a one-dimensional pattern or a two-dimensional pattern.

6. The image forming apparatus as claimed in claim 1, wherein the image interpolation unit further includes an image separation unit configured to decompose colors of the halftone image into images of different color components, and wherein the pixel value estimating unit computes the estimated pixel value based on the different color components of the decomposed images, and the pixel value determination unit determines the correct pixel value of the target pixel subject to interpolation based on the estimated pixel value computed based on the different color components of the decomposed images.

7. A method for computing a correct pixel value of a target pixel subject to interpolation of a halftone image, the method comprising:
setting a base pattern including the target pixel subject to interpolation;
setting at least one reference pattern in a region peripheral to the target pixel subject to interpolation, the reference pattern having a size equal to or larger than a size of the base pattern;
acquiring at least one analogous pattern analogous to the base pattern from the reference pattern;
creating a high-resolution pattern having a predetermined resolution or higher by synthesizing the acquired one or more analogous patterns;
computing an estimated pixel value of the target pixel subject to interpolation based on the created high-resolution pattern; and
determining the correct pixel value of the target pixel subject to interpolation based on the computed estimated pixel value of the target pixel subject to interpolation; and
estimating at least one of a width and a height of a halftone dot as a size of the halftone dot, wherein the size of the base pattern is determined based on the estimated size of the halftone dot.

8. The method as claimed in claim 7, wherein the high-resolution pattern is created by synthesizing the base pattern in addition to the acquired analogous patterns.

9. The method as claimed in claim 7, wherein the estimated pixel value of the target pixel subject to interpolation is computed by utilizing a pixel value corresponding to a position of the target pixel subject to interpolation obtained in the created high-resolution pattern without any change, or by utilizing a pixel value corresponding to a position of a pixel near the target pixel subject to interpolation obtained in the created high-resolution pattern.

10. The method as claimed in claim 9, wherein when the estimated pixel value of the target pixel subject to interpolation is computed by utilizing the pixel value corresponding to the position of the pixel near the target pixel subject to interpolation obtained in the created high-resolution pattern, one of linear interpolation and polynomial interpolation is utilized for computing the estimated pixel value of the target pixel subject to interpolation.

11. The method as claimed in claim 7, wherein the base pattern, the analogous patterns, and the high-resolution pattern are formed of a one-dimensional pattern or a two-dimensional pattern.

12. The method as claimed in claim 7, further comprising: decomposing colors of the halftone image into images of different color components, wherein the estimated pixel value is computed based on the different color components of the decomposed images, and the correct pixel value of the target pixel subject to interpolation is determined based on the estimated pixel value computed based on the different color components of the decomposed images.

13. An image forming apparatus comprising an image interpolation unit configured to compute a correct pixel value of a target pixel subject to interpolation of a halftone image, wherein the image interpolation unit includes:
a base pattern setting unit configured to set a base pattern including the target pixel subject to interpolation;
a reference pattern setting unit configured to set at least one reference pattern in a region peripheral to the target pixel subject to interpolation, the reference pattern having a size equal to or larger than a size of the base pattern;

an analogous pattern acquisition unit configured to acquire analogous patterns analogous to the base pattern from the reference pattern;

a high-resolution pattern creating unit configured to create a high-resolution pattern having a predetermined resolution or higher by synthesizing the acquired analogous patterns;

a pixel value estimating unit configured to compute an estimated pixel value of the target pixel subject to interpolation based on the created high-resolution pattern; and a pixel value determination unit configured to determine the correct pixel value of the target pixel subject to interpolation based on the computed estimated pixel value of the target pixel subject to interpolation, wherein the base pattern setting unit is configured such that the base pattern has a resolution, and wherein the high-resolution pattern creating unit is configured such that the predetermined resolution is greater than the resolution of the base pattern.

14. The image forming apparatus as claimed in claim 13, wherein the high-resolution pattern creating unit creates the high-resolution pattern by synthesizing the base pattern in addition to the acquired analogous patterns.

15. The image forming apparatus as claimed in claim 13, wherein the pixel value estimating unit computes the estimated pixel value of the target pixel subject to interpolation by utilizing a pixel value corresponding to a position of the target pixel subject to interpolation obtained in the created high-resolution pattern without any change, or by utilizing a pixel value corresponding to a position of a pixel near the target pixel subject to interpolation obtained in the created high-resolution pattern.

16. The image forming apparatus as claimed in claim 15, wherein when the pixel value estimating unit computes the estimated pixel value of the target pixel subject to interpolation by utilizing the pixel value corresponding to the position of a pixel near the target pixel subject to interpolation obtained in the created high-resolution pattern, the pixel value estimating unit utilizes linear interpolation or polynomial interpolation for computing the estimated pixel value of the target pixel subject to interpolation.

17. The image forming apparatus as claimed in claim 13, wherein the base pattern, the analogous patterns, and the high-resolution pattern are formed of a one-dimensional pattern or a two-dimensional pattern.

18. The image forming apparatus as claimed in claim 13, wherein the image interpolation unit further includes an image separation unit configured to decompose colors of the halftone image into images of different color components, and wherein the pixel value estimating unit computes the estimated pixel value based on the different color components of the decomposed images, and the pixel value determination unit determines the correct pixel value of the target pixel subject to interpolation based on the estimated pixel value computed based on the different color components of the decomposed images.

19. The image forming apparatus of claim 13, wherein the analogous pattern acquisition unit employs first pattern matching to acquire the analogous patterns, wherein the high-resolution pattern creating unit employs second pattern matching to create the high-resolution pattern, and wherein the second pattern matching is more accurate then the first pattern matching.

* * * * *